United States Patent [19]
Larson et al.

[11] 3,949,844
[45] Apr. 13, 1976

[54] BRAKE COOLING SYSTEM WITH A COMMON FLUID MIXING CHAMBER

[75] Inventors: Donald J. Larson; Lawrence F. Schexnayder, both of Joliet, Ill.

[73] Assignee: Caterpillar Tractor Co., Peoria, Ill.

[22] Filed: Nov. 15, 1974

[21] Appl. No.: 524,113

[52] U.S. Cl. ........ 188/264 P; 188/71.6; 188/264 E; 192/113 B
[51] Int. Cl.² ...................................... F16D 65/853
[58] Field of Search ........... 188/71.6, 264 P, 264 D, 188/264 E; 192/113 B

[56] References Cited
UNITED STATES PATENTS

| | | | |
|---|---|---|---|
| 2,195,130 | 3/1940 | Hoyt | 188/264 D |
| 2,828,840 | 4/1958 | Kelley et al. | 188/71.6 X |
| 2,873,826 | 2/1959 | Werner | 188/71.6 X |
| 2,924,308 | 2/1960 | Kelley | 188/264 E |
| 2,968,372 | 1/1961 | Kern | 188/264 E |
| 3,259,216 | 7/1966 | Klaus et al. | 192/113 B X |

*Primary Examiner*—George E. A. Halvosa
*Attorney, Agent, or Firm*—Wegner, Stellman, McCord, Wiles & Wood

[57] ABSTRACT

A heavy vehicle, such as a tractor scraper, has oil cooled front disc brakes, and oil cooled rear disc brakes that may be used alone or in conjunction with the front brakes. A rear brake cooling circuit and a front brake cooling circuit, each of which has its own pump and heat exchanger, are cross-connected through a common reservoir, and both pumps and heat exchangers function whenever the rear brakes are applied. The rear circuit heat exchanger is an oil cooler with a fan, the motor for which is driven from the pump output and discharges to the cooler; and the motor may drive a bypass pump which draws some oil from the return line and passes it through the cooler.

7 Claims, 2 Drawing Figures

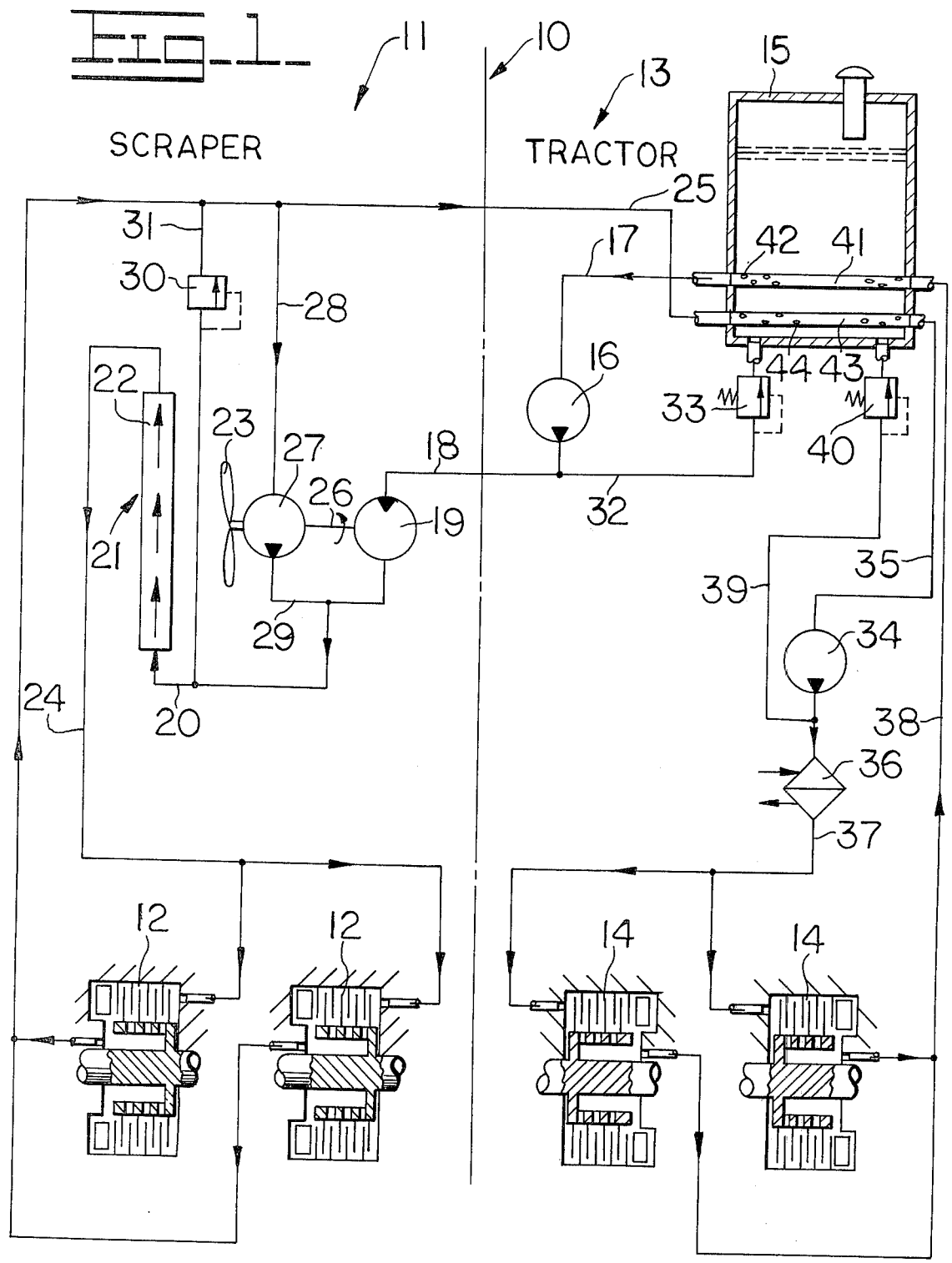

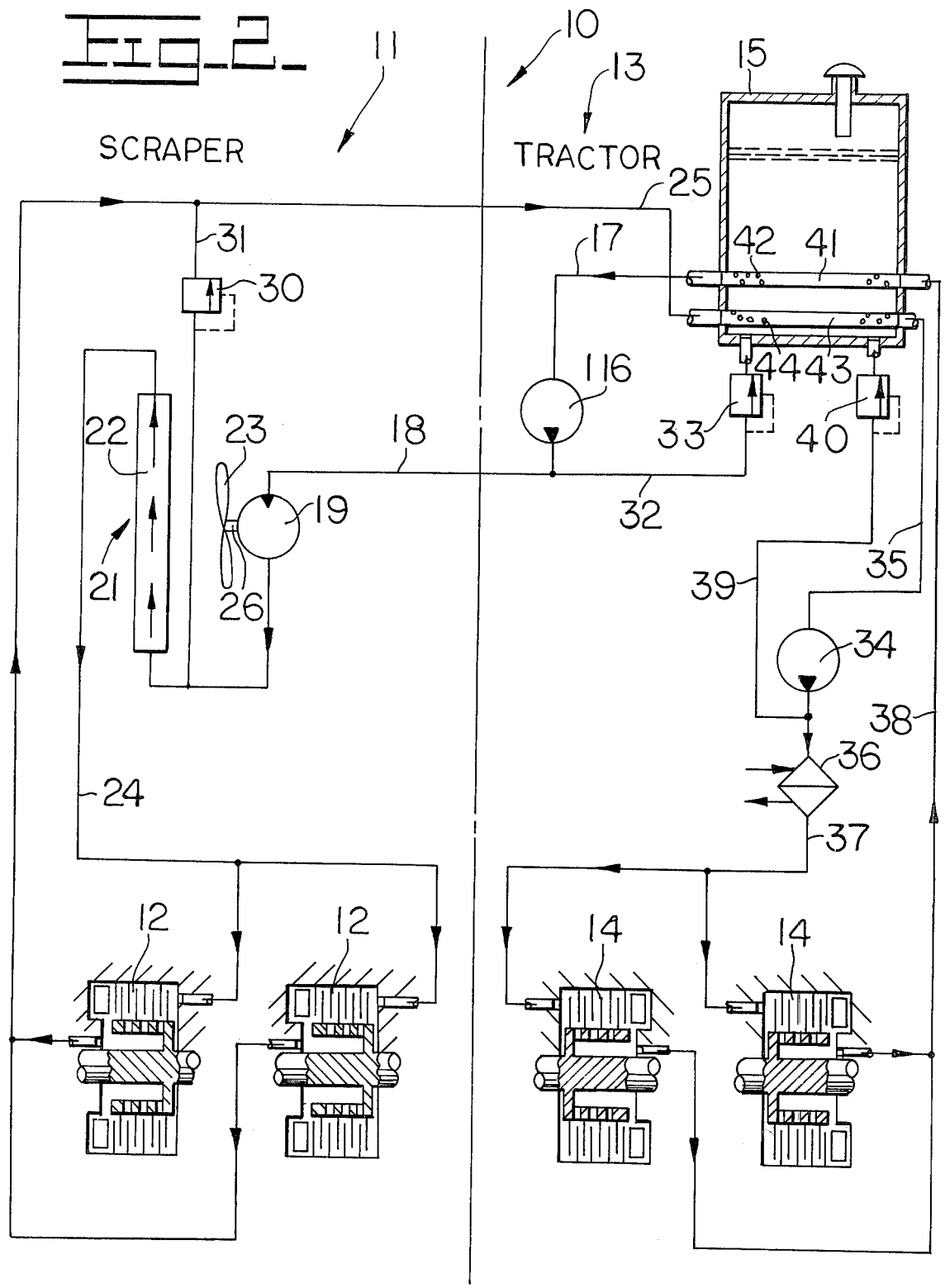

BRAKE COOLING SYSTEM WITH A COMMON FLUID MIXING CHAMBER

BACKGROUND OF THE INVENTION

Heavy vehicles are commonly supplied with disc brakes that are liquid cooled; and in the case of large earth moving vehicles, such as tractor scrapers, the rear and front brakes may have individual cooling systems due to the distance between them. In addition, such vehicles commonly are arranged so that their rear brakes may operate independently of the front brakes when they are being used only to retard vehicle speed, as on a long hill. With independent cooling systems, each must have the capability of dissipating the heat generated by the respective brakes during operation; and this has commonly required that the cooling system for the rear brakes have a much higher capacity than that for the front brakes. This causes the cooling systems for the brakes of such vehicles to be quite expensive and complex.

SUMMARY OF THE INVENTION

In accordance with the present invention, separate cooling circuits for the front disc brakes and rear disc brakes of a heavy vehicle have separate pumps and heat exchangers but they are cross-connected through a common reservoir and both pumps and heat exchangers function whenever the rear brakes are applied.

The cross-connection through the common reservoir causes some of the oil from the rear brake cooling circuit to exchange with oil from the front brake cooling circuit in the common reservoir, so that both heat exchangers function to cool the rear brakes when only those brakes are in use.

In addition, the heat exchanger in the rear brake cooling circuit is of the radiator type with tubes across which cooling air is blown by a fan. The pump output for the rear cooling circuit drives the motor for the fan, and the motor discharges to the cooler.

In a preferred form of the apparatus, a bypass pump which is driven by the fan motor draws some of the oil from the return line between the rear brakes and the common reservoir and returns it directly to the oil cooler comingled with the discharge oil from the motor.

THE DRAWINGS

FIG. 1 is a somewhat schematic hydraulic circuit illustrating a preferred embodiment of the system of the invention; and FIG. 2 is a view of the same type as FIG. 1 illustrating an alternative embodiment.

DETAILED DESCRIPTION OF THE INVENTION

Referring to the drawings in greater detail, and referring first to FIG. 1, a cooling system, indicated generally at 10, includes a rear cooling circuit 11 mounted on the scraper portion of a tractor-scraper vehicle (not shown) for cooling a set of oil cooled disc brakes 12 on the scraper wheels; and a front cooling circuit 13 on the tractor cools oil cooled disc brakes 14 thereon.

A reservoir 15 is common to both of the cooling circuits 11 and 13; and a first pump 16 in the rear cooling circuit draws oil from the reservoir through a first outlet line 17 and delivers it through a line 18 to a fluid motor 19 from which it is discharged through a line 20 to a first heat exchanger 21 which is of the type that includes a radiator 22 and a fan 23. From the first heat exchanger the oil passes through a line 24, through the cooling system for the rear brakes 12, and returns to the reservoir 15 through a first return line 25.

The motor 19 is operatively connected to a shaft 26 which drives the fan 23 and a bypass pump 27. The pump 27 draws a part of the oil from the first return line 25 through a line 28 and delivers it through a line 29 to the line 20 where it is co-mingled with the exhaust oil from the motor 19 and passes through the first heat exchanger 21.

A relief valve 30 is disposed within a line 31 that interconnects the lines 20 and 25 to relieve excessive pressure in the rear cooling circuit 11. In addition, a line 32 from the output of the first pump 16 connects with the reservoir 15 through a relief valve 33.

The front cooling circuit 13 includes a second pump 34 which draws oil from the common reservoir 15 through a second outlet line 35 and delivers it through a second heat exchanger 36 and a line 37 to the cooling system for the front disc brakes 14 which are on the tractor. From the brakes 14 the oil passes through a second return line 38 to the reservoir 15.

An overload relief line 39 connects the output of the second pump 34 with the reservoir 15 through a relief valve 40.

Within the reservoir 15 are a first pipe 41 the sidewall of which is provided with holes 42, and a second pipe 43 the sidewall of which is provided with holes 44. The first outlet line 17 and the second return line 38 are connected to opposite ends of the first pipe 41; while the second outlet line 35 and the first return line 25 are connected to opposite ends of the second pipe 43. Thus, the pipes 41 and 43 with their respective holes 42 and 44 afford a cross-connection within the reservoir 15 between the rear cooling circuit 11 and the front cooling circuit 13.

The capacities of the first pump 16, the second pump 34 and the bypass pump 27 are so balanced that in operation approximately one-half of the oil passing through the rear cooling circuit 11 is delivered by the first pump 16 and about one-half is delivered by the bypass pump 27. Consequently, approximately one-half of the oil exhausted from the rear brakes 12 is returned to the common reservoir 15 through the first return line 25. The oil flow delivered through the front circuit 13 by the second pump 34 is approximately equal to the total flow through the circuit 11, but since there is no bypass pump in the front circuit 13 the flow through the second return line 38 to the pipe 41 is approximately twice that through the first return line 25 to the pipe 43. Conversely, the flow through the second outlet line 35 is about twice that through the first outlet line 17. As a result, oil is constantly exhausted into the reservoir 15 through the holes 42 in the pipe 41; and oil is constantly drawn from the reservoir 15 through the holes 44 in the pipe 43.

The present brake cooling system, which has a rear circuit and a front circuit both receiving oil from a common reservoir, causes intermixing of oil from the two cooling circuits so that, at all times, both of the heat exchangers are effective to contribute to the cooling of the oil in the two circuits. The interchange of oil between the circuits is enhanced in the preferred embodiment of the invention by the combined use of cross connections and a bypass pump in the first circuit 11 which produces unequal flow through the return line and through the outlet line.

When the vehicle is being stopped by using both sets of brakes it can be assumed that the heat generated by each of the sets is substantially equal. The oil flow rate through the first heat exchange 21 and the second heat exchanger 36 is substantially equal so as to provide substantially equal cooling for the two sets of brakes.

When only the rear set of brakes 12 is employed for retarding the vehicle on a down grade, the entire cooling capacity of both circuits and of the two heat exchangers is available for cooling the rear brakes 12.

The alternative embodiment of the invention illustrated in FIG. 2 differs from the preferred embodiment by eliminating the bypass pump 27 with its lines 28 and 29 from the first cooling circuit 11, and utilizing a first pump 116 which has a flow rate equal to that of the second pump 34. Since the first pump is the only element of the alternative embodiment which differs in any respect from the corresponding element in the preferred embodiment, all of the elements in the alternative embodiment with the exception of the first pump are given the same reference numerals as the corresponding elements of the preferred embodiment.

In the alternative embodiment, the oil flow rate through first outlet line 17, the first return line 25, the second outlet line 35 and the second return line 38 is substantially equal. Thus, substantially all of the oil returning to the common reservoir 15 from the rear cooling circuit 11 passes through the pipe 43 into the front cooling circuit; and, conversely, substantially all of the return oil from the front circuit 13 is circulated through the rear circuit 11. Any slight difference in the oil flow between the two circuits is compensated by the holes 42 and 44 in the respective pipes 41 and 43.

The drives for the pumps in the present brake cooling system consist, of course, of hydraulic motors; and the control for those motors may conveniently be in accordance with Klaus et al. U.S. Pat. No. 3,259,216, which discloses a system in which the control valve for the motor of the brake cooling circuit is operated simultaneously with the operation of the control valve for applying the brakes.

The foregoing detailed description is given for clearness of understanding only and no unnecessary limitations should be implied therefrom, as modifications will be obvious to those skilled in the art.

What is claimed is:

1. A system for cooling the brakes of a vehicle, said system comprising, in combination:
    a liquid reservoir;
    an outlet line from said reservoir;
    a liquid pump to withdraw liquid from the reservoir through the outlet line;
    a heat exchanger that includes a liquid cooler, a liquid motor driven by said pump, and a fan driven by said motor for blowing air across the surface of said cooler;
    a line connecting the discharge side of the motor to the liquid cooler and further connecting the cooler to the brakes for conducting liquid from the motor through the cooler to the brakes;
    a return line from the brakes to the reservoir for conducting liquid which has passed through the brakes back to the reservoir;
    a bypass pump;
    a bypass line fron the return line to the low pressure side of the bypass pump;
    and a line which connects the high pressure side of the bypass pump with the line between the motor and the liquid cooler.

2. A system for cooling the brakes of a long, heavy vehicle which has a set of liquid cooled front brakes, and a set of liquid cooled rear brakes which are a long distance to the rear of said set of front brakes and which are selectively operable either separately from or in conjunction with said front brakes, said system comprising, in combination:
    a common liquid reservoir;
    a rear liquid circuit which includes a first outlet line from the reservoir, a first liquid pump to withdraw liquid from the reservoir through said first outlet line, a first heat exchanger separate from said reservoir, first conduit means connecting the first pump to a rear brake cooling system through said first heat exchanger, and a first return line from the rear brake cooling system;
    a front liquid circuit which includes a second outlet line from the reservoir, a second liquid pump to withdraw liquid from the reservoir through said second outlet line, a second heat exchanger separate from said reservoir, second conduit means connecting the second pump to a front brake cooling system through said second heat exchanger, and a second return line from the front brake cooling system;
    said first return line providing communication between the rear brake cooling system, the reservoir, and the second outlet line, and said second return line providing communication between the front brake cooling system, the reservoir, and the first outlet line;
    and means for actuating said first and second liquid pumps simultaneously when said rear brakes are applied, either with or without the front brakes, whereby the entire capacity of the cooling system is available for cooling the rear brakes when they are operated separately from the front brakes.

3. The system of claim 2 which includes first and second pipes in the reservoir with apertured sidewalls for flow of liquid between the reservoir and the interior of said pipes, the first outlet line and the second return line are connected to opposite ends of the first pipe, and the second outlet line and the first return line are connected to opposite ends of the second pipe.

4. The system of claim 2 in which the front and rear liquid circuits are cross-connected within the reservoir by means of pipes that have apertured sidewalls for flow of liquid between the reservoir and the interior of said pipes.

5. The system of claim 2 in which the heat exchanger in the rear liquid circuit comprises a liquid cooler and a fan for blowing air across the surface of said cooler.

6. The system of claim 5 in which the rear liquid circuit includes a liquid motor that is driven by the output from the first pump and drives said fan, and a bypass pump also driven by said motor, said bypass pump withdrawing liquid from the first return line and mingling it with the liquid from the motor at a point upstream from the liquid cooler, so that liquid for cooling the set of rear brakes is partly from the motor and partly from the bypass pump.

7. The system of claim 5 which includes a liquid motor driven by the output from the first pump, said liquid motor driving the fan, and liquid exhaust from said motor passing through the liquid cooler.

* * * * *